(12) United States Patent
Lee et al.

(10) Patent No.: US 7,869,227 B2
(45) Date of Patent: Jan. 11, 2011

(54) POWER SUPPLY APPARATUS AND METHOD

(75) Inventors: Seung-eon Lee, Suwon-si (KR);
Kyoung-geun Lee, Suwon-si (KR);
Jong-cheol Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1149 days.

(21) Appl. No.: 11/148,312

(22) Filed: Jun. 9, 2005

(65) Prior Publication Data

US 2006/0044303 A1 Mar. 2, 2006

(30) Foreign Application Priority Data

Aug. 27, 2004 (KR) ...................... 10-2004-0067715

(51) Int. Cl.
*H02M 3/335* (2006.01)
(52) U.S. Cl. ........................................................ 363/20
(58) Field of Classification Search ................. 363/16, 363/18–21.01, 95, 97, 131
See application file for complete search history.

(56) References Cited

U.S. PATENT DOCUMENTS

| | | | |
|---|---|---|---|
| 4,865,425 A | 9/1989 | Kobayashi et al. | |
| 5,771,160 A * | 6/1998 | Seong | 363/20 |
| 5,796,216 A * | 8/1998 | Beasley | 315/307 |
| 5,864,471 A * | 1/1999 | Kammiller et al. | 363/17 |
| 6,002,596 A * | 12/1999 | Mayer et al. | 363/21.04 |
| 6,307,761 B1 * | 10/2001 | Nakagawa | 363/65 |
| 6,597,589 B2 * | 7/2003 | Wang | 363/21.18 |
| 6,834,002 B2 * | 12/2004 | Yang | 363/89 |
| 6,944,034 B1 * | 9/2005 | Shteynberg et al. | 363/21.13 |
| 7,071,933 B2 * | 7/2006 | Yun | 345/211 |
| 2004/0141343 A1 * | 7/2004 | Lin | 363/65 |
| 2005/0036340 A1 * | 2/2005 | Scarlatescu | 363/34 |
| 2005/0219869 A1 * | 10/2005 | Yang | 363/21.01 |

FOREIGN PATENT DOCUMENTS

| | | |
|---|---|---|
| CN | 1522382 | 8/2004 |
| JP | 2003-47007 | 2/2003 |
| KR | 2003-3684 A | 1/2003 |
| KR | 2004-21846 A | 3/2004 |

OTHER PUBLICATIONS

Chinese Office Action dated Mar. 21, 2008 issued in CN 2005-10096509.1.

(Continued)

*Primary Examiner*—Matthew V Nguyen
(74) *Attorney, Agent, or Firm*—Stanzione & Kim, LLP

(57) ABSTRACT

A method of supplying a power to elements in a power supply apparatus including a primary side and a second side. Particularly, a method of supplying a driving power to an element at the primary side of the power supply apparatus from a primary coil of a transformer. A power factor improvement section improves a power factor of a received alternating current (AC) power. A transformer then receives the AC power having the improved power factor from a primary coil and generates an induced power at a secondary coil. The transformer then provides the AC power to drive a predetermined element located at the primary side of the power supply apparatus from the primary coil.

16 Claims, 4 Drawing Sheets

OTHER PUBLICATIONS

Korean Office Action dated Apr. 26, 2006 issued in KR 2004-67715.
Mohamed Orabi et al.; "Novel Nonlinear Representation for Two-Stage Power-Factor-Correction Converter Instability"; 2003 IEEE; pp. 270-274.
G.M. Wierzba et al.; "A SPICE Macromodel for an Adjustable Positive Voltage Regulator"; 1992 IEEE; pp. 610-614.
Korean Office Action dated Aug. 7, 2007 issued in KR 2007-43262572.
UC1842/3/4/5, "Current Mode PWM Controller", Dec. 31, 1999.

* cited by examiner

POWER SUPPLY APPARATUS AND METHOD

CROSS-REFERENCE TO RELATED APPLICATIONS

This application claims the benefit under 35 U.S.C. §119(a) from Korean Patent Application No. 2004-67715 filed on Aug. 27, 2004 in the Korean Intellectual Property Office, the entire disclosure of which is incorporated herein by reference in its entirety.

BACKGROUND OF THE INVENTION

1. Field of the Invention

The present general inventive concept relates generally to a method of generating a power to supply to elements in a power supply apparatus. More particularly, the present general inventive concept relates to a method of generating a power to drive elements at a primary side of a power supply apparatus.

2. Description of the Related Art

A liquid crystal display (LCD) applies electro-optic effects of a liquid crystal to a display device. The liquid crystal is between a liquid state and a solid state and flows having the characteristics of both a liquid and a solid. The LCD is used as a monitor, a digital television, and other display devices. Hereinafter, a power supply apparatus to drive an LCD is described with reference to FIG. 1.

FIG. 1 illustrates a conventional power supply apparatus to drive an LCD back-light (lamp). The power supply apparatus includes an alternating current (AC) input section 100, a rectifier 102, a power factor correction (PFC) section 104, a converter 110, a main board 130, an inverter 120, and a lamp 132. The PFC section 104 includes a PFC 106 and a rectifier 108. The converter 110 includes a switch 112, a transformer 114, and a rectifier 116. The inverter 120 includes a switch 122 and a transformer 124. Operations of the elements of the power supply apparatus for driving the LCD will now be described.

The AC input section 100 receives an AC power supply. An intensity of the AC power may vary depending on a user setting. The rectifier 102 rectifies the AC power received from the AC input section.

The PFC section 104 improves a power factor with respect to the power received from the rectifier 102. Typically, if the power received from the rectifier 102 is used without any power factor processing, power utilization may decrease. Accordingly, the PFC section 104 improves the power factor with respect to the power received from the rectifier 102 in order to enhance the power utilization.

The power output from the PFC section 104 is transferred to the converter 110 and the inverter 120 as a primary power. The switch 112 of the converter 110 repeatedly switches between on and off states to transfer the received primary power (hot) to a secondary side (cold) of the conventional power supply apparatus. Generally, the primary side of the conventional power supply apparatus includes elements up to a primary coil of the transformer 114, and the secondary side includes elements after a secondary coil of the transformer 114. Thus, the secondary side includes the main board 130, the rectifier 116, and the secondary coil of the transformer 114. The primary side includes the lamp 132, the inverter 120 (including the switch 122 and the transformer 124), the switch 112, and the primary coil of the transformer 114.

The transformer 114 transfers the primary power at the primary side to the secondary side depending on whether the switch 112 is in the on or off state. In particular, the transformer 114 generates an induced power in the secondary coil thereof according to whether the switch 112 is in the on or off state and transfers the power induced in the secondary coil to the secondary side. The rectifier 116 then rectifies the power received from the secondary coil of the transformer 114.

The power output from the converter 110 is a secondary power provided to the main board 130. Elements in the main board 130 utilize the secondary power received from the converter 110 as a driving power. The number of secondary output powers received from the converter 110 may vary depending on a user setting or an amount of power required by the elements of the main board 130. That is, the user can vary the amount of secondary power output by the transformer 114 and/or the number of secondary output powers by changing the configuration of the transformer 114.

The primary power output from the PFC section 104 is also transferred to the inverter 120. The inverter 120 inverts the primary power received from the PFC section 104, which is a DC power, to an AC power. The switch 122 and the transformer 124 included in the inverter 120 operate in the same manner as the switch 112 and the transformer 114 included in the converter 110. However, the transformer 114 reduces the amount of the primary power received (i.e., step down) while the transformer 124 increases the amount of the primary power received (i.e., step up). Typically, the power output from the transformer 124 is about 1.8 kV. The power output from the inverter 120 is then provided to the lamp 132. The lamp 132 is driven using the power provided by the inverter 120.

As mentioned above, the elements of the main board 130 are driven using the secondary power received from the converter 110. The elements in the switch 122 of the inverter 120 are driven using the primary power supplied by the PFC section 104. In this situation, the elements of the switch 122 cannot use the power output from the converter 110. Specifically, the power output from the converter 110 is the secondary power, and the elements of the switch 122 are at the primary side of the conventional power supply apparatus. If the elements at the primary side of the conventional power supply apparatus use the secondary power, a short circuit is likely to occur. Accordingly, the elements at the primary side should be driven using the primary power.

FIG. 2 illustrates an apparatus to generate the primary power to be supplied to the elements at the primary side of the conventional power supply apparatus. The primary power to be supplied to the elements at the primary side is derived from the power output from the PFC section 104. The power output from the PFC section 104 is input to a regulator 200. The regulator 200 reduces the input power to a predetermined level and outputs the reduced power. Typically, the power input to the regulator 200 is between 300V and 400V, and the power output from the regulator 200 is about 5V. The power output from the regulator 200 is then supplied to the elements of the switch 122 at the primary side. The elements of the switch 122 at the primary side are driven using the power supplied by the regulator 200.

The difference between the power input to the regulator 200 and the power output from the regulator 200 determines a power loss at the regulator 200. The greater the difference between the input and output power in the regulator 200, the greater the power loss that occurs in the regulator 200. Moreover, since the 300V to 400V power from the PFC section 104 is reduced to 5V by the regulator 200 and is then input to the inverter 120, the transformer 124 is now required to provide a larger increase in power from 5V to about 1.8 kV used to power the lamp 132 (as opposed to between 300V and 400V to about 1.8 kV). Therefore, it would be desirable to reduce the power loss that occurs in the regulator 200 by adjusting the amount of the power input to the regulator 200.

SUMMARY OF THE INVENTION

The present general inventive concept provides an apparatus and method of reducing a power loss at a regulator in a power supply apparatus used to provide power to an LCD device.

The present general inventive concept also provides an apparatus and method of adjusting an amount of a power input to a regulator to reduce a power loss at the regulator in a power supply apparatus used to provide power to an LCD device.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a power supply apparatus including an input unit to receive an alternating current (AC) power, a power factor improvement unit to improve a power factor of the received AC power, a transformer to receive the AC power having the improved power factor on a primary coil and to generate an induced power on a secondary coil, and a predetermined element located on a primary side of the power supply apparatus to be driven, in part, by the AC power received from the primary coil.

The power supply apparatus may further include a switch to alternate between an on and off switching state at predetermined time intervals with respect to the AC power input to the primary coil to generate the induced power at the secondary coil, and a rectifier to convert the AC power received from the primary coil to a direct current (DC) power.

The power supply apparatus may further include a regulator to receive the DC power and to reduce the DC power to a predetermined level when the DC power from the rectifier exceeds the predetermined level. The predetermined level comprises an amount of power appropriate to drive the predetermined element located at the primary side.

The foregoing and/or other aspects of the present general inventive concept are also achieved by providing a power supply method of supplying power to a predetermined element on a primary side of a power supply apparatus including receiving an alternating current (AC) power, improving a power factor of the received AC power, providing the AC power having the improved power factor to a primary coil of a transformer and generating an induced power at a secondary coil of the transformer, and driving the predetermined element on the primary side of the power supply apparatus using, in part, the AC power received from the primary coil.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
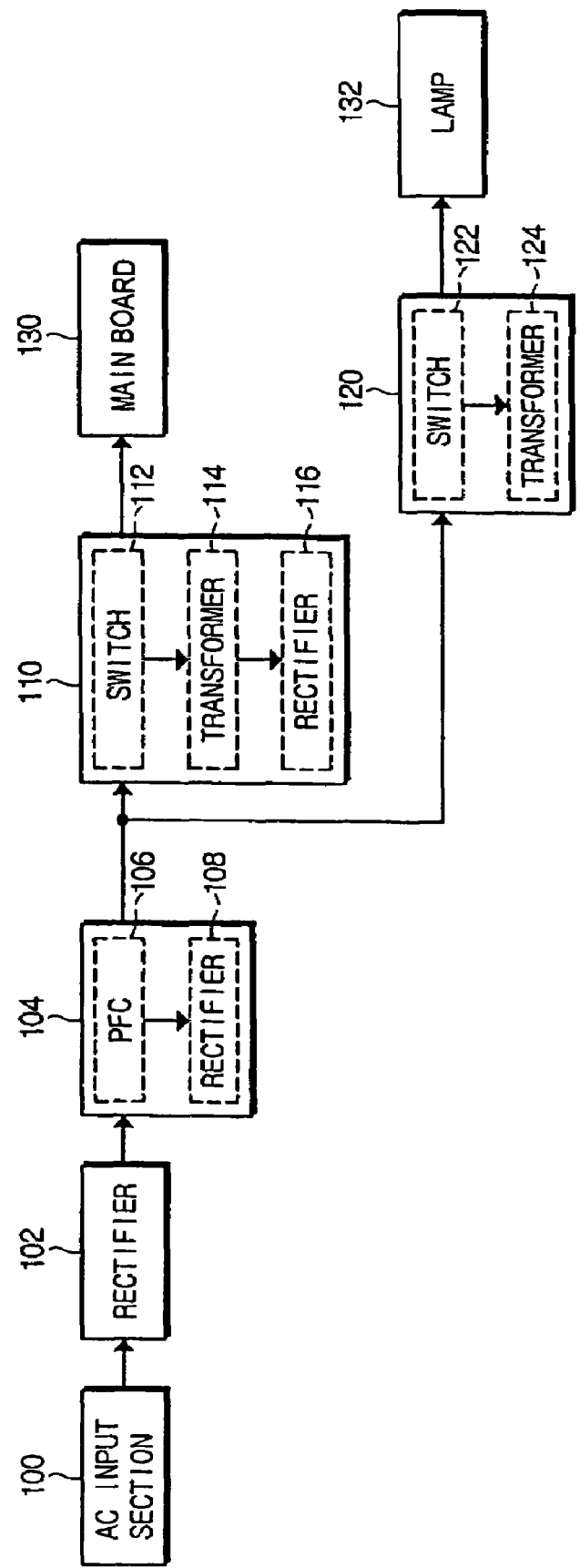
FIG. 1 illustrates a conventional power supply apparatus.
Figure 2:
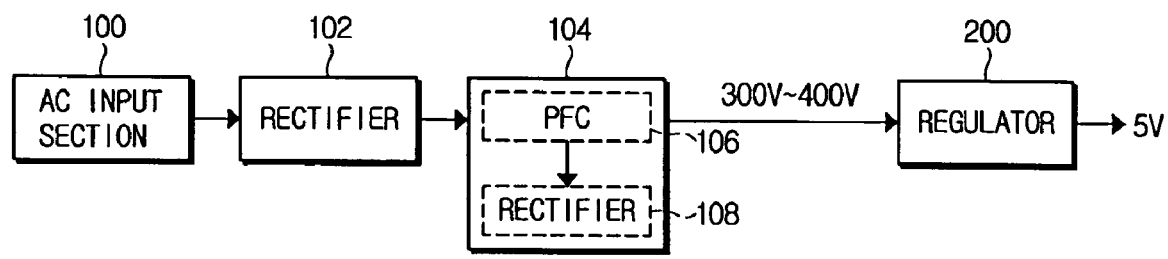
FIG. 2 illustrates an apparatus to generate a power to be supplied to a primary side of the conventional power supply apparatus.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

The present general inventive concept provides an apparatus and a method to transfer a power from a primary coil of a transformer directly to a regulator. Therefore, it is possible to reduce a power loss at the regulator.

Figure 3:
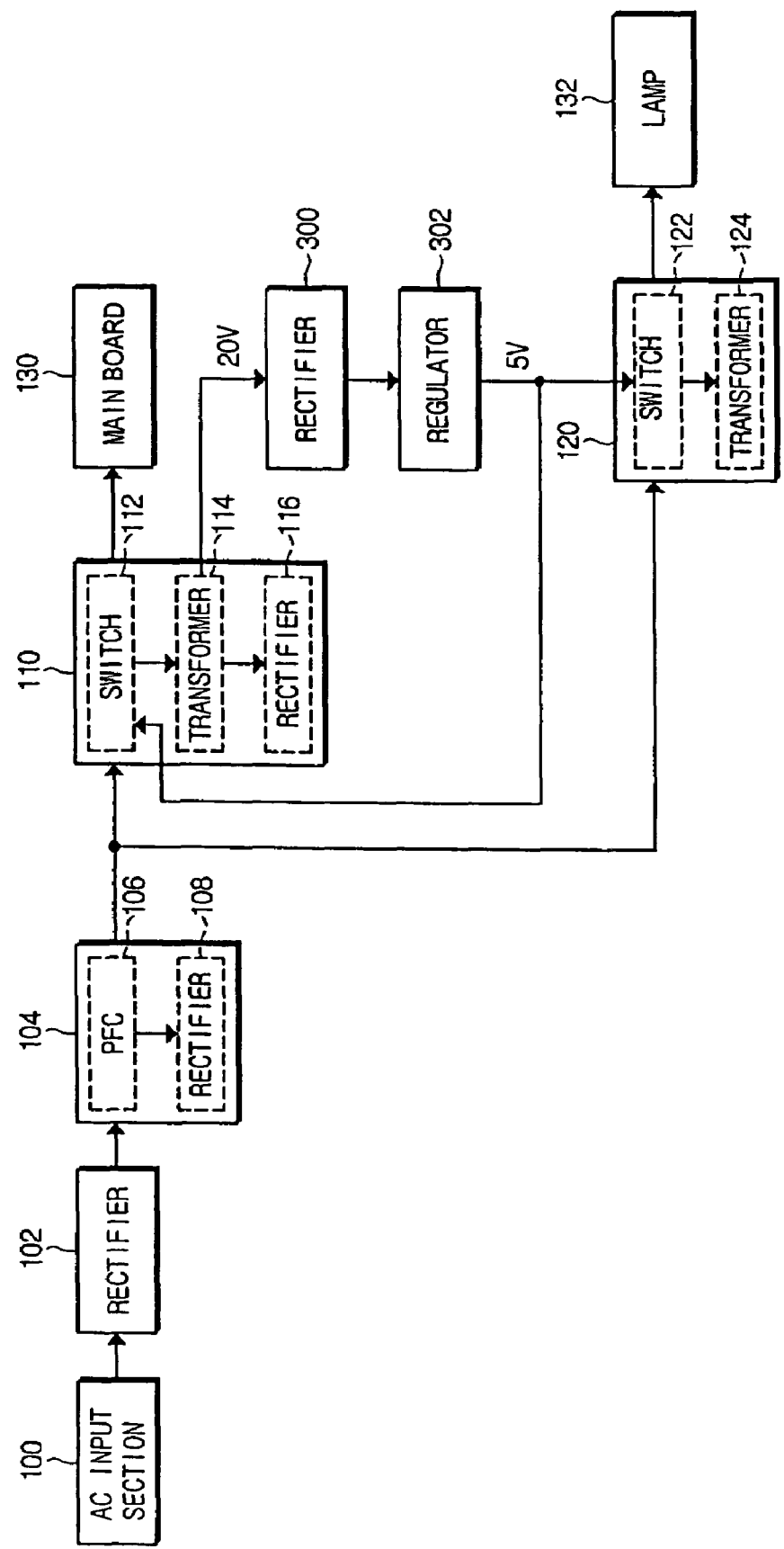
FIG. 3 illustrates a power supply apparatus to drive a liquid crystal display (LCD) according to an embodiment of the present general inventive concept.

FIG. 3 is a block diagram illustrating a power supply apparatus to drive a liquid crystal display (LCD) according to an embodiment of the present general inventive concept, which is described below. The power supply apparatus of FIG. 3 has some of the same elements as the conventional power supply apparatus of FIG. 1; therefore, the same reference numerals are used to refer to the elements that are the same in both figures. The power supply apparatus to drive the LCD includes an AC input section 100, a rectifier 102, a power factor correction (PFC) section 104, a converter 110, a main board 130, an inverter 120, and a lamp 132.

The AC input section 100 receives an AC power supply. An amount of the AC power may vary depending on a user setting or an amount of the power supplied from the power supply apparatus. The rectifier 102 rectifies the received AC power. Generally, the rectifier 102 may include a rectifier diode and a capacitance. The rectifier diode passes only a portion of the AC power having a value that is greater than a predetermined level, and the capacitance smoothes the portion of the AC power passed by the rectifier diode. Accordingly, the AC power is converted to approximate a direct current (DC) power. It should be understood that the rectifier 102 may include other elements instead of (or in addition to) the rectifier diode and the capacitance.

A PFC 106 of the PFC section 104 improves a power factor of the received power. Generally, if the power received from the rectifier 102 is used without any processing thereof, a power utilization may decrease. For example, without the power factor improvement performed by the PFC 106, the power factor ranges from 0.5 to 0.6. In contrast, the power factor improvement performed by the PFC 106 increases the power factor to almost 1. Thus, by using the PFC 106, the power supply apparatus can improve the power factor of the received power, thereby enhancing the utilization of the power. The power having the improved power factor is then rectified by a rectifier 108.

The rectified power is then input to the converter 110 as a primary power. A switch 112 of the converter 110 repeatedly switches between an on and off state to transfer the received primary power to a secondary side.

The transformer 114 transfers the primary power to the secondary side according to whether the switch 112 is in the on or off state. The transformer 114 generates an induced power in a secondary coil (i.e., a secondary power) of the transformer 114 according to whether the switch 112 is in the on or off state, and transfers the secondary power induced in the secondary coil to the secondary side of the power supply apparatus. A rectifier 116 rectifies the received secondary power and outputs the rectified secondary power from the converter 110. The secondary power output from the converter 110 is then input to the main board 130.

Elements of the main board 130 are driven by the secondary power received from the converter 110. According to an amount of the secondary power used by the elements of the main board 130, the main board 130 may receive at least two secondary power supplies from the converter 110. In general, the main board 130 may receive secondary power of about 5V.

The primary power output from the PFC section 104 is also transferred to the inverter 120. The inverter 120 inverts the primary power received from the RFC section 104, which is a DC power, to an AC power. A switch 122 and a transformer 124 included in the inverter 120 operate in the same manner as the switch 112 and the transformer 114 of the converter 110. Yet, while the transformer 114 reduces the amount of the primary power received (i.e., step down), the transformer 124 increases the amount of the primary power received (i.e., step up). Typically, the power output from the transformer 124 is about 1.8 kV. The transformer 124 provides the output power from the inverter 120 to the lamp 132. The lamp 132 can be driven using the power received from the inverter 120.

The following describes a method of generating the primary power to drive elements (i.e., the switch 122 of the inverter 120) at the primary side. As mentioned above, the power at the primary side of the transformer 114 ranges between 300V and 400V. The power supply apparatus induces the required power using, in part, a primary coil of the transformer 114. By using the power at the primary side, it is possible to prevent a short-circuit, which may occur when using the power at the secondary side. Referring to FIG. 3, a power level of 20V is induced from the primary coil of the transformer 114. The power induced from the primary coil of the transformer 114, which is an AC power, is then input to the rectifier 300. The rectifier 300 converts the received AC power to DC power. The power output from the rectifier 300 is input to a regulator 302. The regulator 302 steps down (i.e., reduces) the received power to a power level that is suitable to drive the elements at the primary side.

The power level output from the regulator 302 is about 5V, as described above. The power output from the regulator 302 is then transferred to the elements at the primary side. For instance, in FIG. 3, the power output from the regulator 302 is provided to the switch 112 of the converter 110 and the switch 122 of the inverter 120. FIG. 3 illustrates that the power is induced from the primary coil of the transformer 114 in the converter 110, but not limited to this coil. It should be understood that the user can set the power supply apparatus to induce the power from a primary coil of the transformer 124 in the inverter 120. Since the power level input to the regulator 302 depends on a number of coils at the primary side of the transformer 114, the user can vary the number of coils to obtain a desired amount of the power.

In various embodiments, the transformer 114 may include an auxiliary coil adjacent to the secondary coil on the secondary side of the power supply apparatus. Thus, while about 5V used to drive the rectifier 116 (and the main board 130) is induced on the secondary coil, about 20V can be induced on the auxiliary coil to drive the rectifier 300 and the regulator 302. For example, if the voltage on the primary coil of the transformer 114 is 300V, a first coil ratio from the primary coil to the secondary coil could be used to induce the 5V on the secondary coil. Additionally, a second coil ratio from the primary coil to the auxiliary coil could be used to induce the 20V on the auxiliary coil. The regulator 302 then reduces the 20V to 5V used to drive the switch 122 of the inverter 120 and the switch 112 of the converter 110. Thus, since the regulator 302 reduces the voltage from 20V to 5V, a power loss that occurs in the regulator 302 can be reduced. Additionally, since the 5V is not provided from the secondary coil on the secondary side to the primary side, the possibility of a short circuit is reduced. It should be understood that other voltages can be induced by the secondary and auxiliary coils to drive the primary and secondary sides, respectively, and the coil ratios can be modified accordingly to induce the other voltages on the secondary and auxiliary coils of the transformer 114.

In various embodiments, 20V is induced on the secondary coil of the transformer 114 and is provided to the rectifier 300 and the regulator 302. The regulator 302 reduces the 20V to 5V and provides the 5V to drive the switch 122 in the inverter 120 and the switch 112 of the converter 110 on the primary side.

FIG. 3 illustrates that the power level of about 20V is induced from the primary coil of the transformer 114. Alternatively, the power used to drive the elements at the primary side may be induced directly from the primary coil of the transformer 114. For example, the power of 5V may be induced directly from the primary coil of the transformer 114 to the auxiliary coil. The power induced on the auxiliary coil is then rectified to the DC power by the rectifier 300 and is supplied to the elements at the primary side. Thus, the regulator 302 would be unnecessary.

Although the description of FIG. 3 refers to the main board 130 as typically being driven at 5V, the main board 130 may alternatively be driven at a different voltage level. For example, the main board 130 may be driven at 3.3V. For this reason, a voltage used to drive the switches 112 and 122 is isolated from the voltage used to drive the main board 130.

Figure 4:
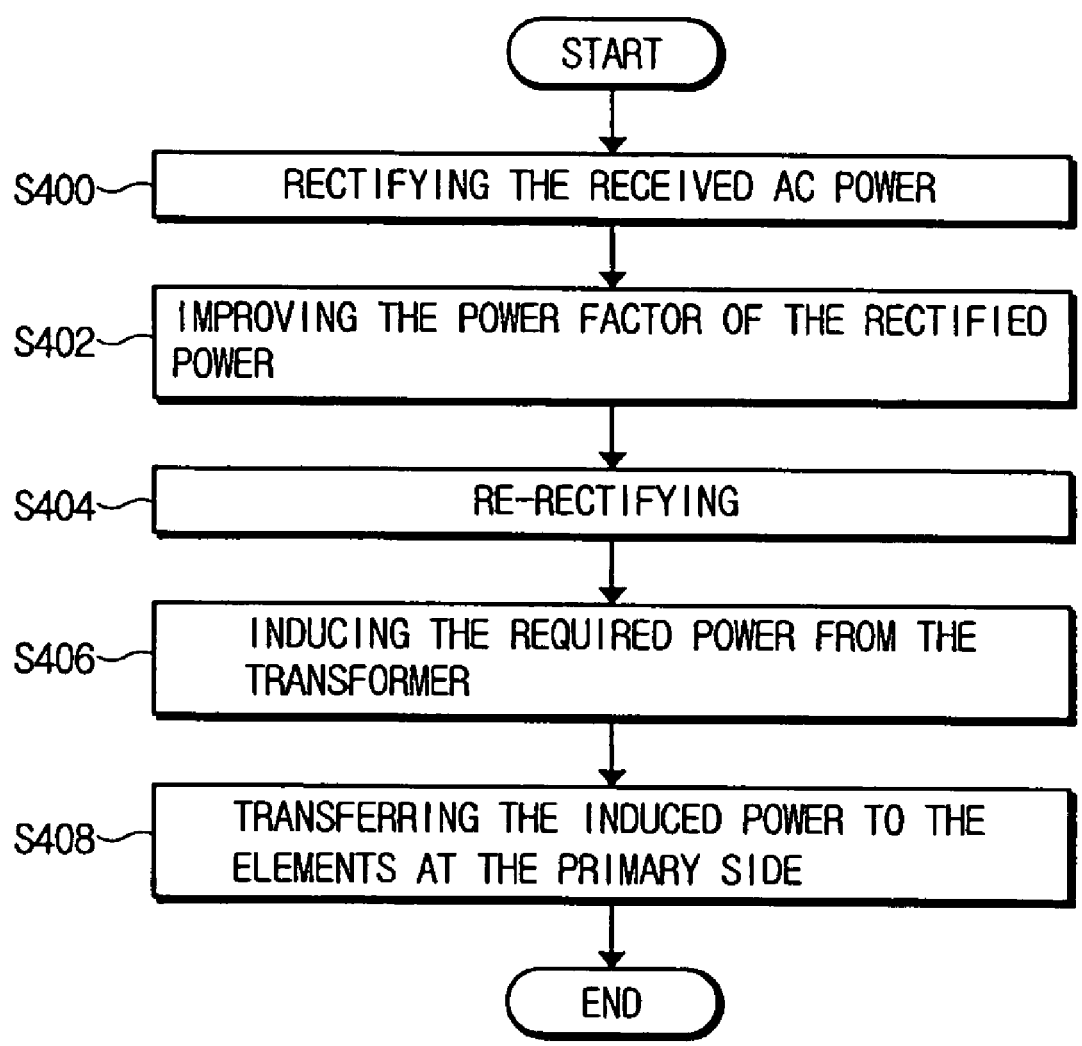
FIG. 4 illustrates an operation of the power supply apparatus of FIG. 3 according to an embodiment of the present general inventive concept.

FIG. 4 is a flowchart illustrating operations of the power supply apparatus of FIG. 3 according to an embodiment of the present general inventive concept. In particular, FIG. 4 illustrates a method of generating the power to be supplied to the elements at the primary side.

The rectifier 102 of the power supply apparatus rectifies an AC power received at the AC input section 100 at operation S400. The rectifier converts the received AC power into a DC power. The PFC 106 of the power supply apparatus improves a power factor of the received power at operation S402. It should be understood that the operation S402 may be omitted according to a user setting.

The rectifier 108 of the power supply apparatus then re-rectifies the power having the improved power factor at operation S404. As a result of the re-rectification operation S404, the received power can be rectified to more closely approximate a DC power.

The power supply apparatus transfers the received power to the secondary side and generates the power to drive the elements at the primary side at operation S406. As described above, the power to drive the elements at the primary side is induced from the primary coil of the transformer 114 in order to prevent a short circuit from occurring. The amount of the power induced from the primary coil of the transformer 114 may differ according to the user setting. The power induced from the transformer 114 is then rectified by the rectifier 300. When the amount of the rectified power is equal to the power level required by the elements at the primary side (e.g., the switch 122 of the inverter 120 and the switch 112 of the converter 110), the power supply apparatus proceeds to operation S408. When the amount of the rectified power exceeds the power level required by the elements at the primary side, the regulator 302 of the power supply apparatus reduces the voltage and proceeds to operation S408.

The power supply apparatus then transfers the induced power to the elements at the primary side at operation S408.

The elements at the primary side are driven by the power received by the rectifier 300 and/or the regulator 302.

In light of the foregoing embodiments, the power used to drive the elements at the primary side of the power supply apparatus is generated from the primary coil of the transformer 114, not from the PFC section 104. Accordingly, it is possible to prevent waste of unnecessary power. As the power consumption depends on the amount of the power provided to the regulator 302, the power consumed at the regulator 302 can be reduced by decreasing the amount of the power provided to the regulator 302. Furthermore, the regulator 302 may not be necessary, because the power used to drive the elements at the primary side can be generated directly from the primary coil of the transformer 114.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply apparatus, comprising:
 a primary side having one or more elements to be driven according to a first voltage;
 a secondary side having one or more elements to be driven according to a second voltage;
 a first transformer to receive an input voltage and to separately provide the first voltage to the one or more elements on the primary side and the second voltage to the one or more elements on the secondary side, the first transformer comprises:
  a primary coil to receive the input voltage,
  a secondary coil to induce the second voltage and to provide the second voltage to the one or more elements on the secondary side,
  an auxiliary coil on the secondary side to induce an intermediate voltage between the input voltage and the first voltage, and
  a regulator to receive the intermediate voltage from the auxiliary coil, to reduce the intermediate voltage to a voltage which equals the first voltage when the intermediate voltage exceeds the first voltage, and to provide the voltage to the one or more elements on the primary side of the primary coil; and
 a second transformer to receive the input voltage and to provide a third voltage to an output element.

2. The apparatus of claim 1, wherein the first transformer comprises:
 a primary coil to receive the input voltage,
 a secondary coil to induce the second voltage and to provide the second voltage to the one or more elements on the secondary side, and
 an auxiliary coil to induce the first voltage and to provide the first voltage to the one or more elements on the primary side.

3. The apparatus of claim 1, wherein the secondary coil and the auxiliary coil are adjacent to each other.

4. The apparatus of claim 1, wherein the intermediate voltage is about 20V.

5. The apparatus of claim 4, further comprising:
 a first switch to receive the input voltage and to selectively provide the input voltage to the primary coil of the first transformer.

6. The apparatus of claim 5, wherein the regulator provides the first voltage to drive the first switch.

7. The apparatus of claim 4, further comprising:
 a second transformer to receive the input voltage and to provide a third voltage to an output element.

8. The apparatus of claim 7, wherein the second transformer includes a primary coil to receive the input voltage and a secondary coil to induce the third voltage.

9. The apparatus of claim 8, further comprising:
 a second switch to receive the input voltage and to selectively provide the input voltage to the primary coil of the second transformer.

10. The apparatus of claim 9, wherein the regulator provides the first voltage to drive the second switch.

11. The apparatus of claim 7, wherein the first transformer comprises a step down transformer and the second transformer comprises a step up transformer.

12. The apparatus of claim 1, further comprising:
 an AC input unit to receive an AC power signal;
 a rectifier to convert the AC power signal to a DC power signal;
 a power factor processing unit to process the power factor of the DC power signal and to provide the DC power signal having the processed power factor to the first transformer.

13. An apparatus to supply power to a primary side and a secondary side of a power supply apparatus, comprising:
 first and second transformers each having a primary coil and at least one secondary coil to convert the input power to first and second driving powers, respectively, and to provide the first and second driving powers to elements on the secondary and primary sides, respectively; and
 first and second switches to receive the input power and to selectively provide the input power to the first and second transformers, respectively, and the first switches being driven by a predetermined switch driving voltage, wherein the predetermined switch driving voltage is induced on a second secondary coil of one of the first and second transformers separate from the first and second driving powers.

14. A method of supplying power in a power supply apparatus having a primary side and a secondary side, the method comprising:
 receiving an input voltage onto a primary coil of a transformer;
 inducing a secondary voltage on a first secondary coil of the transformer and providing the secondary voltage to elements on the secondary side of the power supply apparatus;
 inducing an auxiliary voltage on a second secondary coil of the transformer and providing the auxiliary voltage to the primary side of the power supply apparatus; and
 regulating the auxiliary voltage to be equal to a voltage provided to one or more components on the primary side.

15. A method of supplying power in a power supply apparatus, comprising:
 receiving an input voltage;
 inducing primary and secondary voltages from the input voltage on the same transformer to be supplied to a first and second set of elements, respectively;
 regulating at least one of the primary and secondary voltages to correspond with a required driving power of the first and second set of elements; and
 providing a second induced secondary voltage to the first set of elements,
 wherein the second induced secondary voltage is regulated to be equal to the driving power of the first set of elements.

16. A power supply apparatus, comprising:
a first side having a plurality of first components driven by a first voltage;
a second side having a plurality of second components driven by a second voltage;
a single transformer to receive a third voltage and to separately provide the first voltage to the first components on a primary side of the transformer and the second voltage to the second components on a secondary side of the transformer; and
an auxiliary coil on the secondary side to provide a fourth voltage regulated to be equal to the first voltage provided to the first components on the primary side.

* * * * *